US011511723B2

United States Patent
Yun (10) Patent No.: US 11,511,723 B2
(45) Date of Patent: Nov. 29, 2022

(54) ELECTRIC BOOSTER FOR VEHICLE

(71) Applicant: Hyundai Mobis Co., Ltd., Seoul (KR)

(72) Inventor: Seung Hyun Yun, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 253 days.

(21) Appl. No.: 16/934,287

(22) Filed: Jul. 21, 2020

(65) Prior Publication Data

US 2021/0039619 A1    Feb. 11, 2021

(30) Foreign Application Priority Data

Aug. 5, 2019   (KR) .................... 10-2019-0094703

(51) Int. Cl.
  *B60T 13/74*   (2006.01)
  *B60T 8/17*    (2006.01)
  *B60T 7/04*    (2006.01)

(52) U.S. Cl.
  CPC ............ *B60T 13/746* (2013.01); *B60T 7/042* (2013.01); *B60T 8/17* (2013.01); *B60T 13/745* (2013.01); *B60Y 2400/81* (2013.01)

(58) Field of Classification Search
  CPC ......... B60T 13/745; B60T 13/575; F15B 7/08
  See application file for complete search history.

(56) References Cited

U.S. PATENT DOCUMENTS

| 5,699,713 A * | 12/1997 | Mortimer | B60T 13/575 91/369.2 |
|---|---|---|---|
| 6,044,750 A * | 4/2000 | Eick | B60T 13/72 91/367 |
| 10,493,969 B2 | 12/2019 | Gaffe et al. | |
| 2011/0048874 A1 * | 3/2011 | Vollert | B60T 13/745 188/152 |
| 2014/0041378 A1 * | 2/2014 | Richard | B60T 13/745 60/545 |
| 2016/0101767 A1 * | 4/2016 | Charpentier | B60T 13/745 303/15 |
| 2017/0253225 A1 * | 9/2017 | Lopez | B60T 17/221 |
| 2019/0023249 A1 * | 1/2019 | Gaffe | B60T 7/042 |
| 2019/0389439 A1 * | 12/2019 | Panunzio | B60T 11/18 |
| 2021/0245724 A1 * | 8/2021 | Nagel | B60T 13/746 |

FOREIGN PATENT DOCUMENTS

CN   107949507   4/2018

OTHER PUBLICATIONS

Office Action dated Jul. 15, 2022, issued to Chinese Patent Application No. 202010728827.

* cited by examiner

*Primary Examiner* — Bradley T King
(74) *Attorney, Agent, or Firm* — H.C. Park & Associates, PLC (57) ABSTRACT

An electric booster for a vehicle including: a disc holder accommodating a reaction disc, a screw nut rotated in conjunction with an operation of a motor, a screw bolt linearly moved in conjunction with a rotation of the screw nut, a boosting block disposed between the reaction disc and the screw bolt, and contacting a radially outer portion of the reaction disc when the screw bolt moves, a pedal rod contacting a radially central portion of the reaction disc through the screw bolt and the boosting block, a disc holder pressing hole connected to the screw bolt, and disposed to face the disc holder, and a first breakage prevention gap part formed between the disc holder and the disc holder pressing hole.

12 Claims, 8 Drawing Sheets

FIG. 8

ELECTRIC BOOSTER FOR VEHICLE

CROSS-REFERENCE TO RELATED APPLICATION

This application claims priority from and the benefit of Korean Patent Application No. 10-2019-0094703, filed on Aug. 5, 2019, which is hereby incorporated by reference for all purposes as if set forth herein.

BACKGROUND

Field

Exemplary embodiments relate to an electric booster for a vehicle, and more particularly, to an electric booster for a vehicle for increasing brake performance using electric power.

Discussion of the Background

Generally, a braking device of a vehicle generates a frictional force by decelerating a vehicle during traveling or pushing a brake pad to maintain a parking state. However, since a driver's force is limited, brake performance is increased through boosting by a booster. Conventionally, a booster using vacuum is used. Recently, an electric booster using a motor tends to be used.

According to such an electric booster, in a normal vehicle operation state, that is, when a driver depresses a brake pedal in a normal state, not only a pedal stroke effort, but also a driving force of a motor is applied to a reaction disc as a boosted force together. However, in a state where the pedal stroke effort and a driving force of the motor do not operate together, and only the motor is driven, or only a pedal rod is moved, the amounts of elastic deformation in a portion of the reaction disc corresponding to a screw bolt and a portion thereof corresponding to the pedal rod are different from each other, and the difference between the amounts of elastic deformation increases, thereby causing damage due to shear stress or the like applied to the reaction disc.

Conventionally, in order to prevent damage to the reaction disc, by additionally inserting a buffer member between the pedal rod and a block member installed inside a housing, or by integrally coupling the pedal rod with the block member using a key member or the like, a deformation force is prevented from being biased to a portion of the reaction disc.

However, according to the related art, not only are there problems involved in designing, manufacturing, and assembling additional parts such as the buffer member and the key member in addition to the components for implementing a boosting operation, but also there is a problem in that the size of the device is expanded more to secure a space for coupling them. Accordingly, there is a need to solve the problems.

The above information disclosed in this Background section is only for enhancement of understanding of the background of the invention and, therefore, it may contain information that does not constitute prior art.

SUMMARY

Exemplary embodiments of the present invention provide an electric booster for a vehicle, which may prevent damage to a reaction disc due to an operation of a deformation force biased to a portion of the reaction disc, and may be easily applied with a simple structure.

Additional features of the invention will be set forth in the description which follows, and in part will be apparent from the description, or may be learned by practice of the invention.

An exemplary embodiment of the present invention provides an electric booster for a vehicle including: a reaction disc of an electric booster for a vehicle; a disc holder in which the reaction disc is accommodated; a screw nut which is rotated in conjunction with an operation of a motor; a screw bolt which is linearly moved toward the reaction disc in conjunction with a rotation of the screw nut; a boosting block which is disposed between the reaction disc and the screw bolt, and is in contact with a radially outer portion of the reaction disc when the screw bolt moves; a pedal rod which is in contact with a radially central portion of the reaction disc through the screw bolt and the boosting block; a disc holder pressing hole which is connected to the screw bolt, and is disposed to face the disc holder; and a first breakage prevention gap part which is formed between the disc holder and the disc holder pressing hole at a first set width, and limits an amount of elastic deformation in the reaction disc by the boosting block to the first set width or less.

The disc holder may include: a disc accommodating part which has a more expanded diameter than that of the reaction disc, is formed to extend in a moving direction of the screw bolt, and accommodates the reaction disc; a piston pressing part which is consecutively formed at one side of the disc accommodating part, and is in contact with a piston; and a connection opening part which is formed to be opened at the other side of the disc accommodating part, and forms a passage through which the boosting block and the pedal rod are inserted into the disc accommodating part.

The disc holder may further include: a pressing stabilizing part which is formed to protrude radially from an end of the disc accommodating part, and faces the disc holder pressing part together with the end of the disc accommodating part.

The disc holder may further include: an elastic member assembling part which is formed to be stepped at a bounder portion between the disc accommodating part and the pressing stabilizing part, and into which an elastic member for returning the reaction disc to an initial location is fitted and locked.

The boosting block may include: a bolt inner diameter coupling part which is fitted into an inner diameter portion of the screw bolt; and a disc outer pressing part which is connected to the bolt inner diameter coupling part, is disposed to face the radially outer portion of the reaction disc outside the screw bolt, and presses the radially outer portion of the reaction disc at the first set width when the disc holder pressing hole is in contact with the disc holder.

The boosting block may further include: a boosting transfer locking part which is formed to be stepped at a boundary portion between the bolt inner diameter coupling part and the disc outer pressing part, and is locked to an end of the screw bolt.

The disc holder pressing part may include: a bolt outer diameter coupling part which is coupled to an outer diameter portion of the screw bolt; and a holder pressing part which is formed to extend radially from the bolt outer diameter coupling part, has a more expanded diameter than that of the reaction disc, is disposed to face the disc holder, and is in contact with the disc holder when the amount of elastic deformation in the radially outer portion of the reaction disc reaches the first set width.

The electric booster for a vehicle may further include: a jump-in gap part which is formed between the reaction disc and the pedal rod at a second set width; and a second breakage prevention gap part which is formed between the boosting block and the pedal rod at a third set width, and limits the amount of elastic deformation in the reaction disc by the pedal rod to a value equal to or less than a fourth set width corresponding to a difference between the second set width and the third set width.

The boosting block may include: a bolt inner diameter coupling part which is coupled to be slidable to an inner diameter portion of the screw bolt, and faces the pedal rod; a disc outer pressing part which is connected to the bolt inner diameter coupling part, and is disposed to face the radially outer portion of the reaction disc outside the screw bolt; and a rod guide hole part which is formed through the bolt inner diameter coupling part and the disc outer pressing part, and guides a movement of the pedal rod.

The pedal rod may include: a boosting block pressing part which has a more expanded diameter than that of the rod guide hole part, is disposed inside the screw bolt, and is disposed to face the bolt inner diameter coupling part at a separation interval corresponding to the third set width; and a disc central pressing part which is connected to the boosting block pressing part, extends toward the reaction disc through the rod guide hole part, and is disposed to be spaced apart from the reaction disc at a separation interval corresponding to the second set width.

Another exemplary embodiment of the present invention provides an electric booster for a vehicle including: a reaction disc; a disc holder in which the reaction disc is accommodated; a screw nut which is rotated in conjunction with an operation of a motor; a screw bolt which is linearly moved toward the reaction disc in conjunction with a rotation of the screw nut; a boosting block which is disposed between the reaction disc and the screw bolt, and is in contact with a radially outer portion of the reaction disc when the screw bolt moves; a pedal rod which is in contact with a radially central portion of the reaction disc through the screw bolt and the boosting block; a disc holder pressing hole which is connected to the screw bolt, and is disposed to face the disc holder; a jump-in gap part which is formed between the reaction disc and the pedal rod at a second set width; and a second breakage prevention gap part which is formed between the boosting block and the pedal rod at a third set width, and limits the amount of elastic deformation in the reaction disc by the pedal rod to a value equal to or less than a fourth set width corresponding to a difference between the second set width and the third set width.

The boosting block may include: a bolt inner diameter coupling part which is coupled to be slidable to an inner diameter portion of the screw bolt, and faces the pedal rod; a disc outer pressing part which is connected to the bolt inner diameter coupling part, and is disposed to face the radially outer portion of the reaction disc outside the screw bolt; and a rod guide hole part which is formed through the bolt inner diameter coupling part and the disc outer pressing part, and guides the movement of the pedal rod.

The pedal rod may include: a boosting block pressing part which has a more expanded diameter than that of the rod guide hole part, is disposed inside the screw bolt, and is disposed to face the bolt inner diameter coupling part at a separation interval corresponding to the third set width; and a disc central pressing part which is connected to the boosting block pressing part, extends toward the reaction disc through the rod guide hole part, and is disposed to be spaced apart from the reaction disc at a separation interval corresponding to the second set width.

The electric booster for a vehicle according to the inventive concepts may limit the amount of elastic deformation in the reaction disc by the boosting block to a value equal to or less than the set width, at which damage does not occur, by the first breakage prevention gap part formed between the disc holder and the disc holder pressing hole at the first set width and the second breakage prevention gap part formed between the boosting block and the pedal rod at the third set width.

Accordingly, it is possible to prevent the excessive stress, which is caused as only one side of the radially inner portion and the radially central portion of the reaction disc are intensively, elastically deformed in a motor sole operation state or a pedal rod sole operation state, from being applied to the boundary portion between the radially outer portion and the radially central portion. As a result, it is possible to prevent the damage to and breakage of the reaction disc.

The present disclosure may be easily implemented by the simple structure including only the component for implementing the boosting operation without additionally designing, manufacturing, and assembling the components such as a buffer member and a key member, compared to the conventional exemplary embodiment in which the buffer member is additionally disposed between the pedal rod and the boosting block, or the pedal rod and the block member are integrally coupled to each other using the key member and the like, thereby improving productivity and reducing the cost. In addition, the present disclosure may be miniaturized, which is advantageous for the layout of a vehicle for utilizing a limited vehicle space.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, exemplary embodiments of an electric booster for a vehicle according to the present disclosure will be described with reference to the accompanying drawings. In this process, the thicknesses of the lines or the sizes of components illustrated in the drawings may be exaggerated for clarity and convenience of explanation. In addition, terms to be described later are terms defined in consideration of functions in the present disclosure, which may vary according to a user or operator's intention or practice. Accordingly, definitions of these terms should be made based on the contents throughout this specification.

Figure 1:
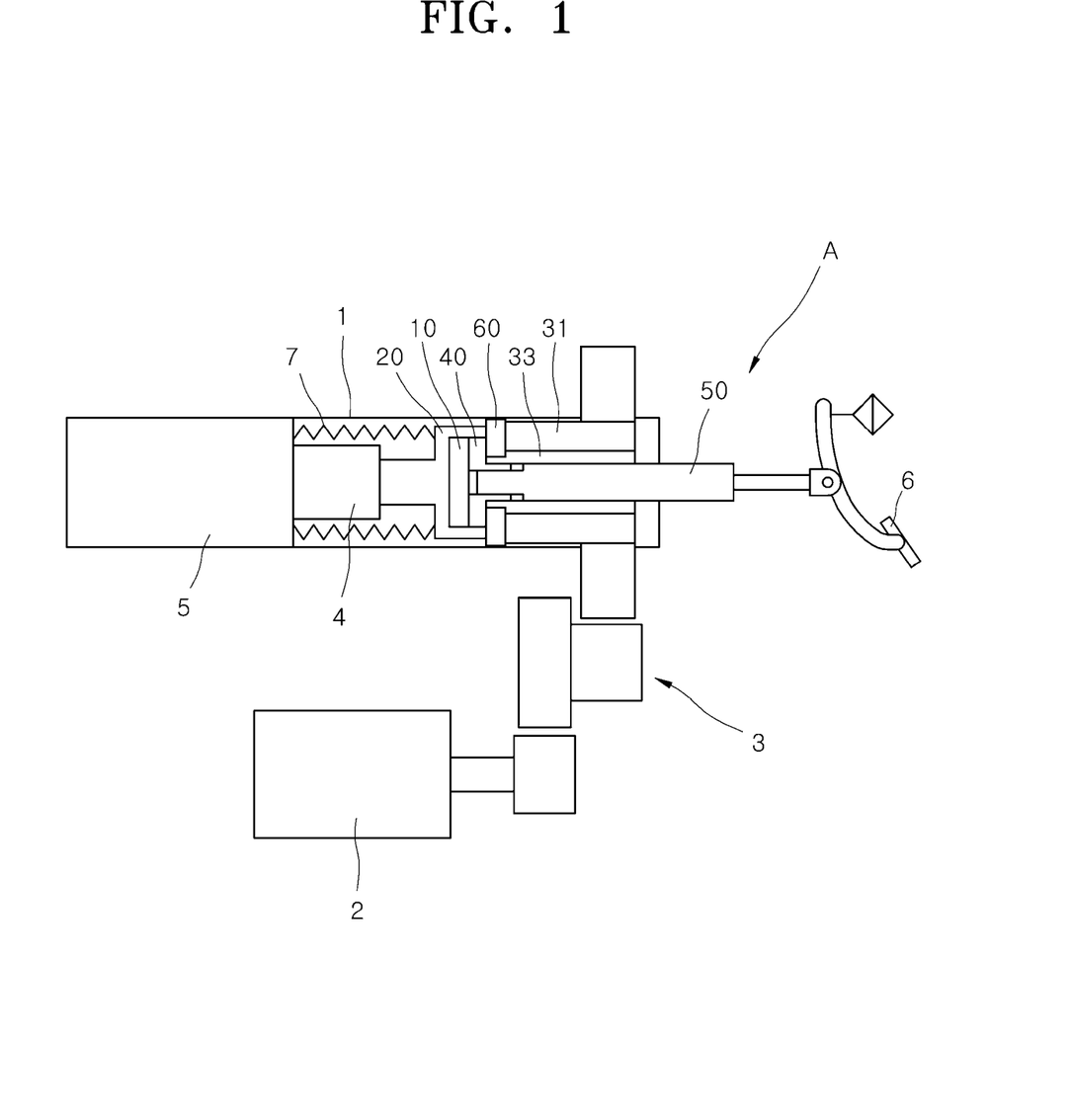
FIG. 1 is a conceptual diagram schematically illustrating an electric booster for a vehicle according to an exemplary embodiment of the present disclosure.
Figure 2:
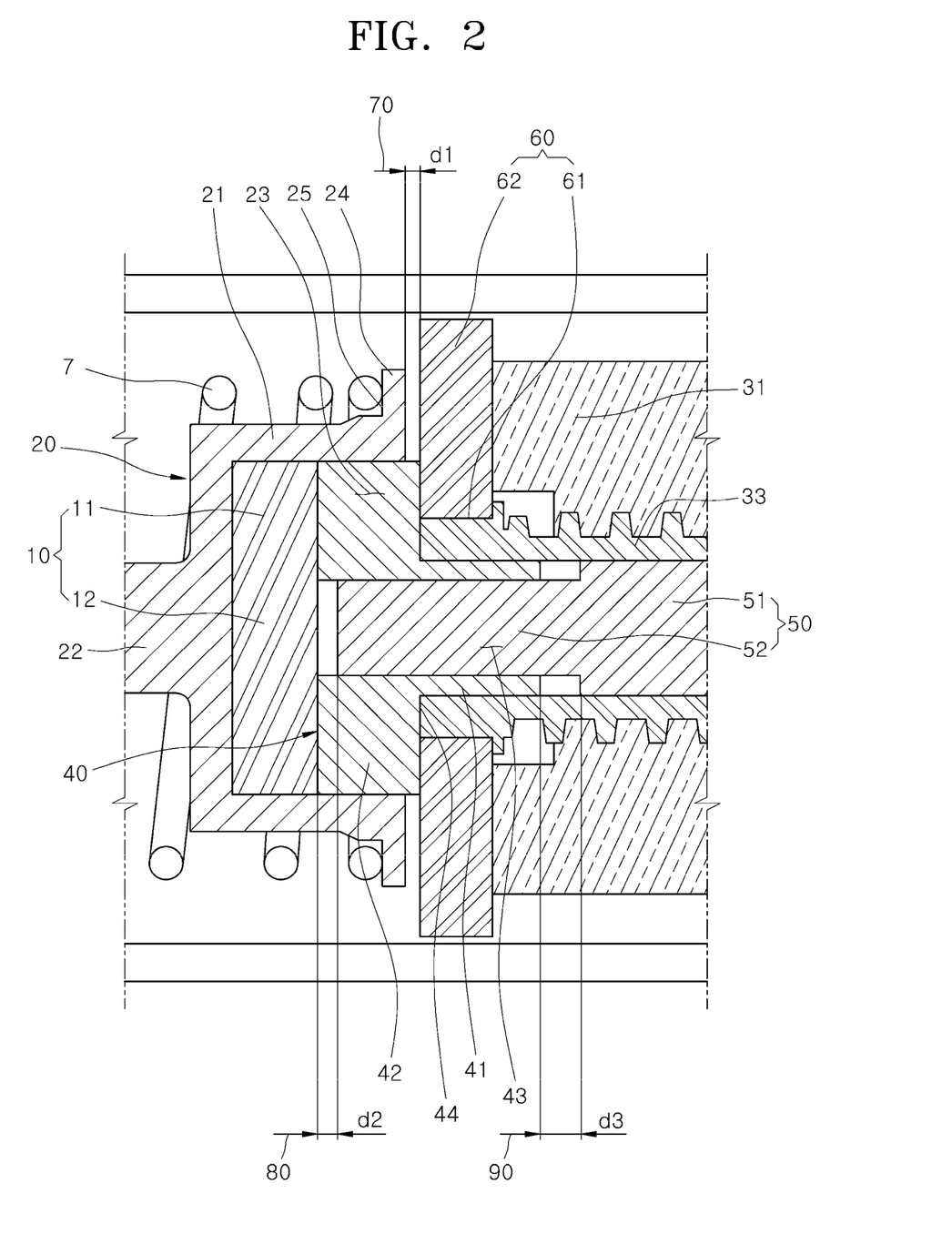
FIG. 2 is a cross-sectional diagram of main portions of the electric booster for a vehicle according to the exemplary embodiment of the present disclosure.

FIG. 1 is a conceptual diagram schematically illustrating an electric booster A for a vehicle according to an exemplary embodiment of the present disclosure, and FIG. 2 is a cross-sectional diagram of main portions of the electric booster A for a vehicle according to the exemplary embodiment of the present disclosure.

Referring to FIGS. 1 and 2, the electric booster A for a vehicle according to an exemplary embodiment of the present disclosure includes a reaction disc 10, a disc holder 20, a screw nut 31, a screw bolt 33, a boosting block 40, a pedal rod 50, a disc holder pressing hole 60, a first breakage prevention gap part 70, a jump-in gap part 80, and a second breakage prevention gap part 90.

The reaction disc 10 is made of an elastic material which is elastically deformable, such as rubber, has a disc shape, and is disposed among a piston 4, the screw bolt 33, and the pedal rod 50. The disc holder 20 is a device part for holding the reaction disc 10 at a set location, and installed inside a housing 1 in a state of being elastically supported by an elastic member 7. The reaction disc 10 is accommodated inside the disc holder 20 and disposed at the set location inside the housing 1.

With respect to the reaction disc 10 and the disc holder 20, the piston 4 is disposed at one side (a left side in FIG. 2), and the screw bolt 33 and the pedal rod 50 are disposed at the other side (a right side in FIG. 2). The movement displacement of the screw bolt 33 and the pedal rod 50 is transferred to the piston 4 through the reaction disc 10 and the disc holder 20.

If the reaction disc 10 has a disc shape, a radially outer portion 11 of the reaction disc 10 has a ring shape, and a radially central portion 12 of the reaction disc 10 has a circular shape disposed inside the radially outer portion 11. The radially outer portion 11 and the radially central portion 12 of the reaction disc 10 are disposed to face the screw bolt 33 and the pedal rod 50, respectively.

The screw nut 31 is rotated in conjunction with an operation of the motor 2. When the motor 2 is driven, a rotational force generated by the motor 2 is transferred to the screw nut 31 through a power transfer device 3 connected to a drive shaft of the motor 2. The power transfer device 3 may be a gear member, a belt member, or the like.

The screw bolt 33 is screwed to an inner diameter portion of the screw nut 31, and presses the reaction disc 10 in conjunction with the rotation of the screw nut 31 or is linearly moved in a direction (a left and right direction in FIG. 2) spaced apart from the reaction disc 10. The rotational displacement of the screw nut 31 is converted to the linear displacement of the screw bolt 33 as described above, and is finally applied to the piston 4 through the reaction disc 10 and the disc holder 20, and the hydraulic pressure for braking the vehicle is formed inside a cylinder 5 by the movement of the piston 4.

Hereinafter, in describing the linear movement of the screw bolt 33 and the pedal rod 50 and the movement of other components interlocked thereto, the left side is set as a forward direction, and the right side is set as a backward direction with respect to the states illustrated in FIGS. 1 and 2 for convenience of explanation. That is, the movement in the direction of pressing the piston 4 is set as a forward direction, and the movement in the direction spaced apart from the piston 4 is set as a backward direction.

The boosting block 40 is a device part for uniformly dispersing and transferring the movement force of the screw bolt 33 to the radially outer portion 11 of the reaction disc 10 having a more expanded diameter than that of the screw bolt 33, and has a cross-sectional shape corresponding to the radially outer portion 11 of the reaction disc 10, and is disposed between the reaction disc 10 and the screw bolt 33.

One side of the boosting block 40 is in contact with the reaction disc 10, and the other side of the boosting block 40 is in contact with the screw bolt 33. When the screw bolt 33 moves forward, the boosting block 40 is pushed by the screw bolt 33 to press the radial outer portion 11 of the reaction disc 10.

The pedal rod 50 is in contact with the radially central portion 12 of the reaction disc 10 through the screw bolt 33 and the boosting block 40. The pedal rod 50 is connected to a brake pedal 6, and the pedal rod 50 is moved in conjunction with the movement of the brake pedal 6 generated when the driver depresses the brake pedal 6. When the pedal rod 50 moves forward, the pedal rod 50 presses the radially central portion 12 of the reaction disc 10.

Figure 3:
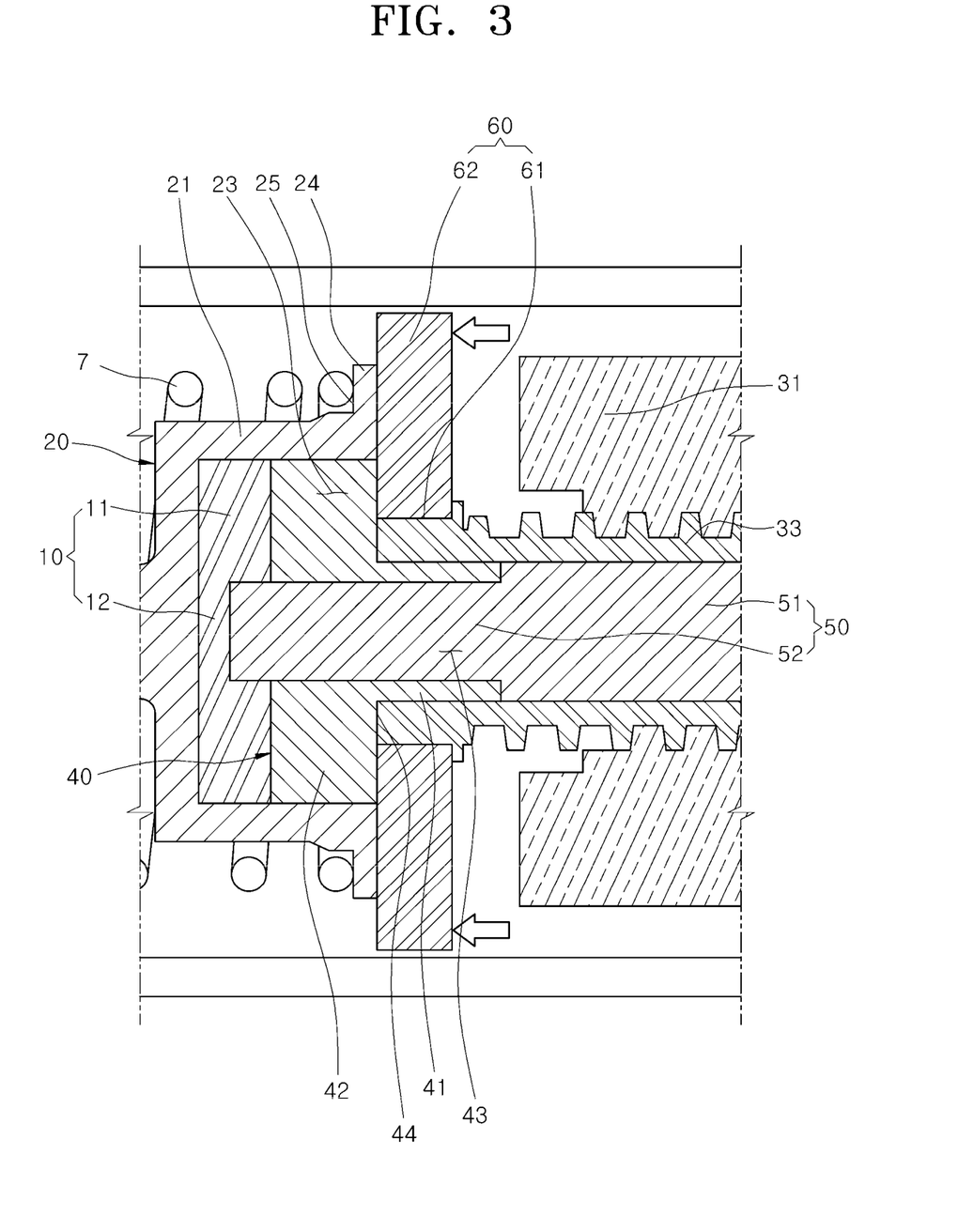
FIG. 3 is a cross-sectional diagram of the main portions illustrating a normal operation state of the electric booster for a vehicle according to the exemplary embodiment of the present disclosure.

FIG. 3 is a cross-sectional diagram of the main portions illustrating a normal operation state of the electric booster for a vehicle according to the exemplary embodiment of the present disclosure.

By sensing it upon the movement of the brake pedal 6 to drive the motor 2 together, the screw bolt 33 and the pedal rod 50 move forward together, and the boosting block 40 and the pedal rod 50 press the radially outer portion 11 and the radially central portion 12 of the reaction disc 10, respectively as illustrated in FIG. 3.

When the driver 2 depresses the brake pedal 6 in a state where a vehicle is normally operated without failure of the motor 2 or the like, that is, in a normal state, not only the pedal stroke effort but also the driving force of the motor 2 is applied to the reaction disc 10 together as described above.

The disc holder pressing hole 60 is coupled to the end of the screw bolt 33 and moved to the same displacement as the screw bolt 33, and is disposed to face the disc holder 20. When the screw bolt 33 moves forward, the boosting block 40 is pushed by the screw bolt 33 to move forward and presses the reaction disc 10, and at the same time, the disc holder pressing hole 60 moves forward together and is in contact with the disc holder 20 or presses the disc holder 20.

The first breakage prevention gap part 70 is a device part for limiting the amount of elastic deformation in the reaction disc 10 by the boosting block 40 to a first set width d1 or less, and is formed between the disc holder 20 and the disc holder pressing hole 60 at the first set width d1. The first set width d1 may be determined within a proper range, in which damage to the reaction disc 10 does not occur, through experiments or the like.

In setting the first set width d1, it is preferable to variably apply the first set width d1 according to the specifications of a vehicle comprehensively in consideration of the material characteristics, an elastic modulus, the areas and ratios of the radially outer portion 11 and the radially central portion 12 of the reaction disc 10, and the like.

When the screw bolt 33 moves forward, the boosting block 40 presses the radially outer portion 11 of the reaction disc 10. In implementing the braking of a vehicle, when no pedal stroke effort is applied to the brake pedal 6 and only the motor 2 is driven, the pressing force is not applied to the radially central portion 12 of the reaction disc 10, and the pressing force is applied to only the radial outer portion 11.

By limiting the amount of elastic deformation in the radially outer portion 11 of the reaction disc 10 to the first set width d1 by the first breakage prevention gap part 70, it is possible to prevent a difference between the amounts of elastic deformation in the radially outer portion 11 and the radially central portion 12 from exceeding the first set width d1 in the aforementioned motor sole operation state.

The aforementioned operation of the first breakage prevention gap part 70 may prevent the excessive stress from being applied to the boundary portion between the radially outer portion 11 and the radially central portion 12 due to the difference between the amounts of elastic deformation in the radially outer portion 11 and the radially central portion 12, thereby preventing damage to the reaction disc 10.

The jump-in gap part 80 is formed between the reaction disc 10 and the pedal rod 50 at a second set width d2. In the initial stage of the braking operation of the driver, the reaction disc 10 and the pedal rod 50 are kept spaced apart from each other by the jump-in gap part 80, so that in the case where the driver depresses the brake pedal 6 to initially move the vehicle, the pedal rod 50 may be smoothly moved even without rapidly increasing the pedal stroke effort until the interval corresponding to the jump-in gap part 80 is canceled, which is referred to as a jump-in effect.

In the initial state, the radially outer portion 11 of the reaction disc 10 is in elastic contact with the boosting block 40 by the elastic force of the elastic member 7 or the like. Accordingly, in the initial state, the radially central portion 12 of the reaction disc 10 has a shape protruding at a predetermined interval rightward from the left end of the boosting block 40, and the jump-in gap part 80 is set as the second set width d2, which is an interval capable of separating the right end of the radially central portion 12 of the reaction disc 10 and the pedal rod 50, in order to implement the jump-in effect.

The jump-in effect occurs until the moment when the pedal rod 50 fills the gap corresponding to the jump-in gap part 80 or the gap corresponding to the second set width d2, that is, the moment when the radially central portion 12 of the reaction disc 10 and the pedal rod 50 are in contact with each other. Such a jump-in effect enables quick braking when the driver operates the brake pedal 6.

The second breakage prevention gap part 90 is a device part for limiting the amount of elastic deformation in the radially central portion 12 of the reaction disc 10 by the pedal rod 50 to a value equal to or less than a fourth set width d3-d2 corresponding to a difference between the second set width d2 and a third set width d3, and is formed between the boosting block 40 and the pedal rod 50 by the third set width d3. The third set width d3 may be determined within a proper range, in which damage to the reaction disc 10 does not occur, through experiments or the like.

In setting the third set width d3, it is preferable to variably apply the third set width d3 according to the specifications of a vehicle comprehensively in consideration of the second set width d2, the material characteristics an elastic modulus, the areas and ratios of the radially outer portion 11 and the radially central portion 12 of the reaction disc 10, and the like.

When the pedal rod 50 moves forward, the pedal rod 50 presses the radially central portion 12 of the reaction disc 10. In implementing the braking of a vehicle, when the pedal stroke effort is applied to only the brake pedal 6 and the motor 2 is not driven due to failure of the motor 2 or the like, the pressing force is not applied to the radially outer portion 11 of the reaction disc 10, and the pressing force is applied to only the radially central portion 12.

By limiting the amount of elastic deformation in the radially central portion 12 of the reaction disc 10 to the fourth set width d3-d2 by the second breakage prevention gap part 90, it is possible to prevent a difference between the amounts of elastic deformation in the radially outer portion 11 and the radially central portion 12 from exceeding the fourth set width d3-d2 in the aforementioned pedal rod sole operation state.

The aforementioned operation of the second breakage prevention gap part 90 may prevent the excessive stress from being applied to the boundary portion between the radially outer portion 11 and the radially central portion 12 due to the difference between the amounts of elastic deformation in the radially outer portion 11 and the radially central portion 12, thereby preventing damage to the reaction disc 10.

Referring to FIG. 2, the disc holder 20 according to the exemplary embodiment of the present disclosure includes a disc accommodating part 21, a piston pressing part 22, a connection opening part 23, a pressure stabilizing part 24, and an elastic member assembling part 25.

The disc accommodating part 21 is a device part in which the reaction disc 10 is accommodated, has a more expanded diameter than that of the reaction disc 10, and is formed to extend in the moving direction of the screw bolt 33. The reaction disc 10 is accommodated inside the disc accommodating part 21, and the left side thereof is in contact with the disc accommodating part 21. The piston pressing part 22 is formed to extend toward the piston 4 from one side of the disc accommodating part 21 facing the piston 4, and is in contact with the piston 4.

The connection opening part 23 is formed to be opened to the other side of the disc accommodating part 21, and forms a passage through which the boosting block 40 and the pedal rod 50 are inserted into the disc accommodating part 21. The boosting block 40 and the pedal rod 50 may be in direct contact with the reaction disc 10, accommodated in the disc accommodating part 21, through the connection opening part 23, and may clearly apply the movement force to the reaction disc 10.

The pressure stabilizing part 24 is formed to protrude radially from the right end of the disc accommodating part 21, and faces the disc holder pressing hole 60 together with the right end of the disc accommodating part 21. By forming the pressure stabilizing part 24, the pressure stabilizing part 24 may be in contact with the disc holder pressing hole 60 over a more extending area including not only an area corresponding to the right end of the disc accommodating part 21 but also an area corresponding to the right end of the pressure stabilizing part 24, thereby securing contact stability between the disc holder pressing hole 60 and the disc holder 20, and operation stability of the entire electric booster A for a vehicle according to the present disclosure.

The elastic member assembling part 25 is a device part for providing an assembly surface with the elastic member 7 for returning the reaction disc 10 to the initial location, and is formed to be stepped at the boundary between the disc accommodating part 21 and the pressure stabilizing part 24. The elastic member assembling part 25 has a structure in which an outer diameter portion of the disc accommodating part 21 extending in a forward and backward direction and the left portion of the pressure stabilizing part 24 extending radially are consecutively connected to each other.

The elastic member 7 has a coil spring structure and is fitted around the disc accommodating part 21, and the right end thereof is installed in contact with the pressure stabilizing part 24. The elastic member 7 elastically supports the disc holder 20 at the left side, that is, at the piston 4 side.

When the pressing force to the left side is applied to the disc holder 20, the disc holder 20 may be reliably moved by the displacement corresponding to the pressing force, in a state of being supported by the elastic member 7. When the pressing force is released, the disc holder 20 returns to the initial location by an elastic restoring force of the elastic member 7.

Referring to FIG. 2, the boosting block 40 according to the exemplary embodiment of the present disclosure includes a bolt inner diameter coupling part 41, a disc outer pressing part 42, a rod guide hole part 43, and a boosting transfer locking part 44.

The bolt inner diameter coupling part 41 is slidably coupled to the inner diameter portion of the screw bolt 33. The bolt inner diameter coupling part 41 is inserted into the inner diameter portion of the screw bolt 33, and faces a boosting block pressing part 51 (to be described later) of the pedal rod 50 disposed through the inner diameter portion of the screw bolt 33.

The disc outer pressing part 42 is a device part which is in pressure contact with the reaction disc 10, is integrally connected with the left portion of the bolt inner diameter coupling part 41, and is disposed to face the radially outer portion 11 of the reaction disc 10 outside the screw bolt 33. The reaction disc 10 has a more expanded diameter than that of the screw bolt 33, and the disc outer pressing part 42 which presses the radially outer portion 11 of the reaction disc 10 has a more expanded diameter than that of the bolt inner diameter coupling part 41.

The rod guide hole part 43 is a hollow part which guides the forward and backward movement of the pedal rod 50, and is formed across the central portions of the bolt inner diameter coupling part 41 and the disc outer pressing part 42 in a forward and backward direction. A disc central pressing part 52 (to be described below) of the pedal rod 50 may directly press the reaction disc 10 through the rod guide hole part 43.

The boosting transfer locking part 44 is a device part which provides an assembly surface with the screw bolt 33, and is formed to be stepped at the boundary between the bolt inner diameter coupling part 41 and the disc outer pressing part 42. The boosting transfer locking part 44 has a shape corresponding to the left end of the screw bolt 33. More specifically, the boosting transfer locking part 44 has a structure in which an outer diameter portion of the bolt inner diameter coupling part 41 extending in a forward and backward direction, and the right end of the disc outer pressing part 42 extending radially are consecutively connected to each other.

When being inserted into the inner diameter portion of the screw bolt 33, the bolt inner diameter coupling part 41 of the boosting block 40 is inserted up to a depth at which the boosting transfer locking part 44 is locked to the left end of the screw bolt 33, and a location of the boosting block 40 which may be maximally moved rightward with respect to the left end of the screw bolt 33 is determined.

The state where the screw bolt 33 and the boosting block 40 are coupled to each other may be stably maintained in a forward and backward direction and radially by the boosting transfer locking part 44, and the left end of the screw bolt 33 may stably apply the pressing force to the boosting block 40 in the state of being in close contact with and coupled to the boosting transfer locking part 44 as described above. In addition, the boosting block 40 may be stably moved to be slidable in the forward and backward direction of the boosting block 40 with respect to the left end of the screw bolt 33 by the boosting transfer locking part 44.

Referring to FIG. 2, the pedal rod 50 according to the exemplary embodiment of the present disclosure includes the boosting block pressing part 51 and the disc central pressing part 52.

The boosting block pressing part 51 is disposed to extend in a forward and backward direction inside the screw bolt 33. The boosting block pressing part 51 has a more expanded diameter than that of the rod guide hole part 43, is disposed at the right side of the boosting block 40, and is disposed to face the bolt inner diameter coupling part 41 of the boosting block 40 at a separation interval corresponding to the third set width d3.

The disc central pressing part 52 is integrally connected to the left end of the boosting block pressing part 51, extends toward the reaction disc 10, and is located inside the rod guide hole part 43. The disc central pressing part 52 is disposed to be spaced apart from the reaction disc 10 at a separation interval corresponding to the second set width d2.

When the pedal rod 50 moves forward by the third set width d3 in the state where the screw bolt 33 is stopped, the disc central pressing part 52 is moved by the second set width d2 to cancel the jump-in gap part 80, and then the boosting block pressing part 51 is moved further by the fourth set width d3-d2, so that the operation of contacting the bolt inner pdiameter coupling part 41 of the boosting block 40 is sequentially performed. Subsequently, when the pedal rod 50 continuously moves forward, the boosting block 40 is moved leftward with the same displacement as the pedal rod 50, and presses the reaction disc 10 together with the pedal rod 50.

Referring to FIG. 2, the disc holder pressing hole 60 according to the exemplary embodiment of the present disclosure includes a bolt outer diameter coupling part 61 and a holder pressing part 62.

The bolt outer diameter coupling part 61 is a device part which corresponds to an inner diameter portion of the disc holder pressing hole 60, and is coupled and fixed to the outer diameter portion of the screw bolt 33. The holder pressing part 62 is a device part which corresponds to an outer diameter portion of the disc holder pressing hole 60, is formed to extend radially from the bolt outer diameter coupling part 61, has a more expanded diameter than that of the reaction disc 10, and is disposed to face the disc holder 20.

When the screw bolt 33 moves forward, the boosting block 40 and the disc holder pressing hole 60 coupled to the left end of the screw bolt 33 are moved together, and in the state where the boosting block 40 presses the radially outer portion 11 of the reaction disc 10 with the amount of elastic deformation corresponding to the first set width d1, the disc holder pressing hole 60 is in contact with the disc holder 20. Thereafter, when the screw bolt 33 continuously moves forward, the boosting block 40 and the disc holder pressing hole 60 are moved leftward with the same displacement as the screw bolt 33, and press the reaction disc 10 and the disc holder 20.

Figure 4:
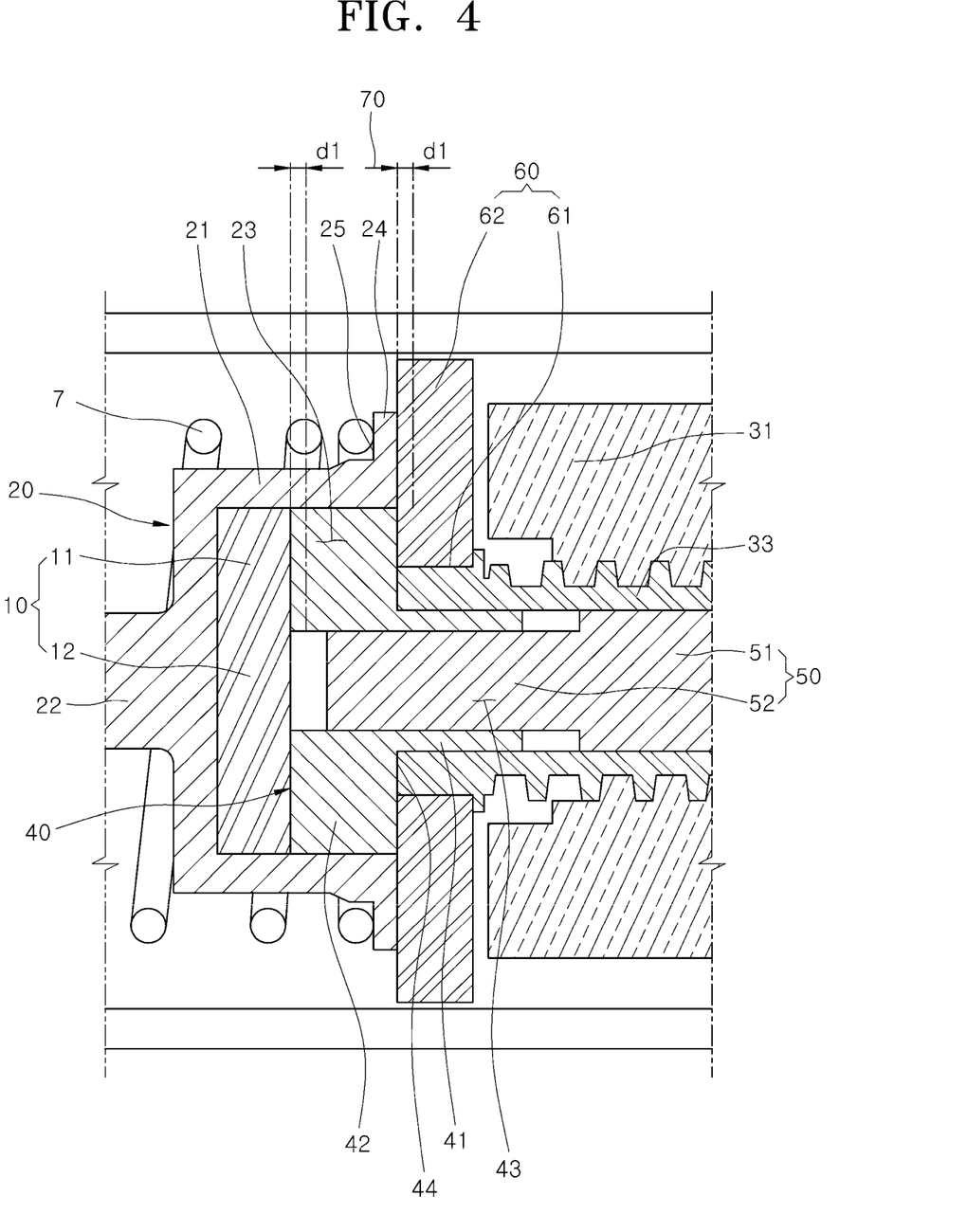
FIG. 4 is a cross-sectional diagram of the main portions illustrating a motor sole operation state of the electric booster for a vehicle according to the exemplary embodiment of the present disclosure.
Figure 5:
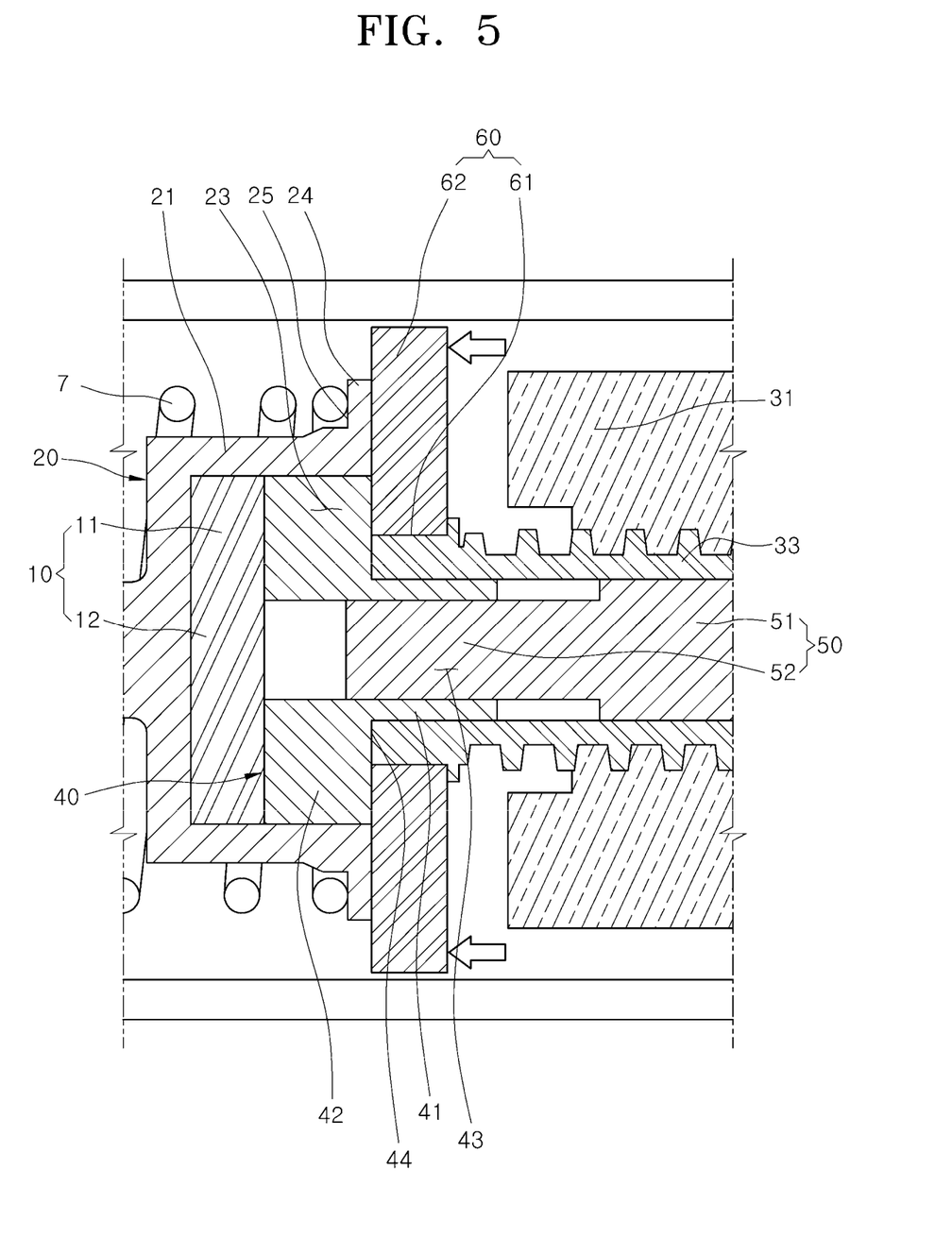
FIG. 5 is a cross-sectional diagram of the main portions illustrating a state where a screw bolt further moves toward a reaction disc in the state illustrated in FIG. 4.

FIG. 4 is a cross-sectional diagram of the main portions illustrating a motor sole operation state of the electric booster for a vehicle according to the exemplary embodiment of the present disclosure, and FIG. 5 is a cross-sectional diagram of the main portions illustrating a state where the screw bolt further moves forward toward the reaction disc in the state illustrated in FIG. 4.

When an autonomous emergency brake (AEB), which autonomously performs emergency braking even without a driver's reaction, or the like is operated, braking is performed only with the driving force of the motor 2, without operation of the pedal stroke effort. At this time, as illustrated in FIG. 4, the pedal rod 50 maintains a state of being stopped at the initial location, and only the screw bolt 33 moves forward toward the reaction disc 10.

At this time, the boosting block 40 and the disc holder pressing hole 60 coupled to the left end of the screw bolt 33 are moved leftward with the same displacement as the screw bolt 33. While the screw bolt 33 moves forward by the first set width d1 as illustrated in FIG. 4, the boosting block 40 presses the radially outer portion 11 of the reaction disc 10 by the first set width d1 in the state where both sides of the boosting block 40 are in contact between the screw bolt 33 and the reaction disc 10.

In the state where the screw bolt 33 moves forward by the first set width d1, the first breakage prevention gap part 70 is canceled, and the disc holder pressing hole 60 is in contact with the disc holder 20. That is, the boosting block 40 is in contact with the reaction disc 10 in the state of pressing the radially outer portion 11 of the reaction disc 10 by the first set width d1, and the disc holder pressing hole 60 is in contact with the disc holder 20.

Thereafter, when the screw bolt 33 continuously moves forward, as illustrated in FIG. 5, the boosting block 40 and the disc holder pressing hole 60 are moved leftward with the same displacement as the screw bolt 33 in the state of being in contact with the reaction disc 10 and the disc holder 20, respectively, and presses the reaction disc 10 and the disc holder 20 toward the piston 4. In the above operation process, the radially outer portion 11 of the reaction disc 10 is limitedly deformed by the amount of elastic deformation corresponding to the first breakage prevention gap part 70 compared to the radially central portion 12.

Accordingly, it is possible to prevent damage to the reaction disc 10 which is caused as only the radially outer portion 11 of the reaction disc 10 is intensively, elastically deformed, and more specifically, the radially outer portion 11 of the reaction disc 10 is elastically deformed to the extent of exceeding the first set width d1 compared to the radially central portion 12 of the reaction disc 10.

Figure 6:
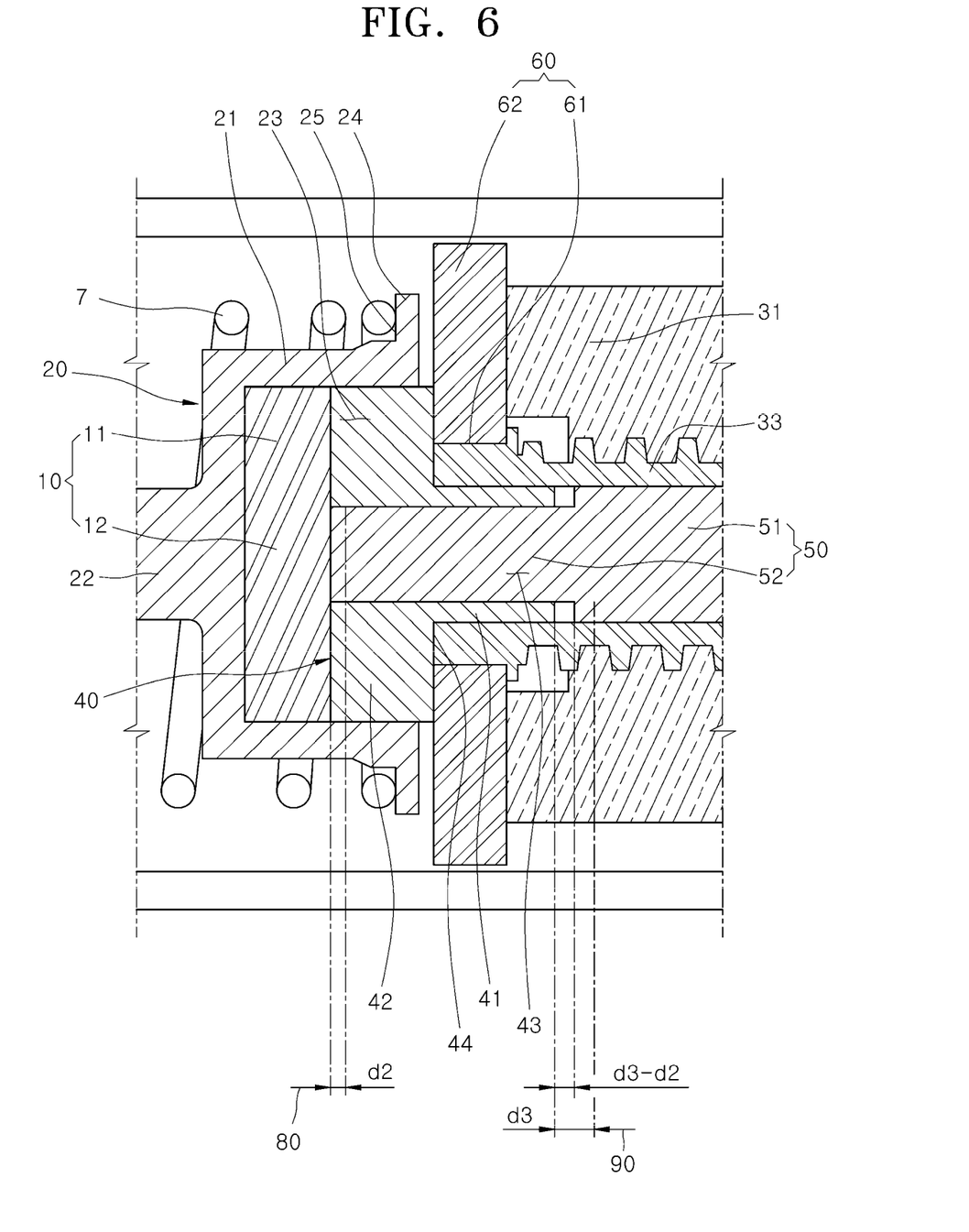
FIG. 6 is a cross-sectional diagram of the main portions illustrating a pedal rod sole operation state of the electric booster for a vehicle according to the exemplary embodiment of the present disclosure.
Figure 7:
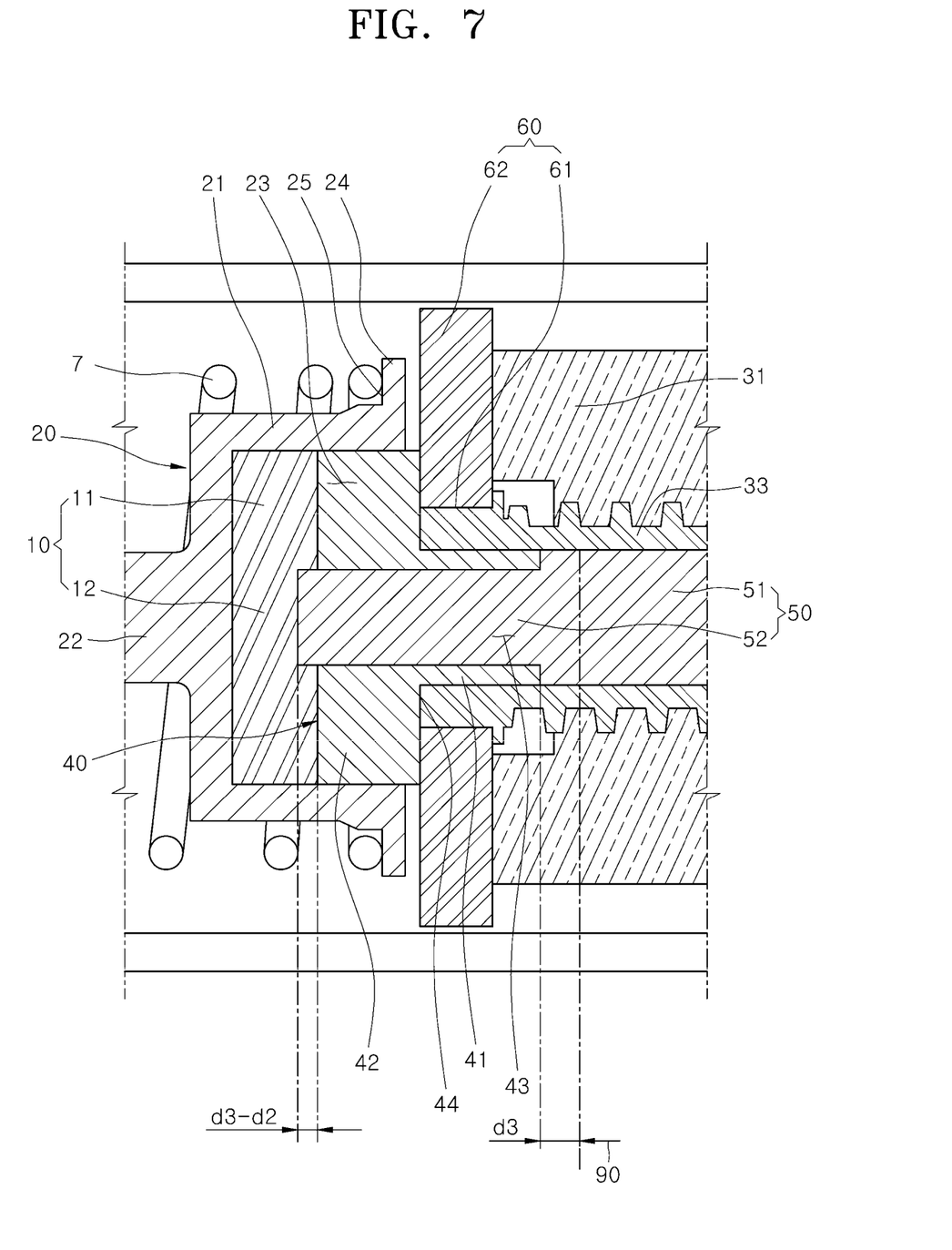
FIG. 7 is a cross-sectional diagram of the main portions illustrating a state where the pedal rod further moves toward the reaction disc in the state illustrated in FIG. 6 and is in contact with a booting block.
Figure 8:
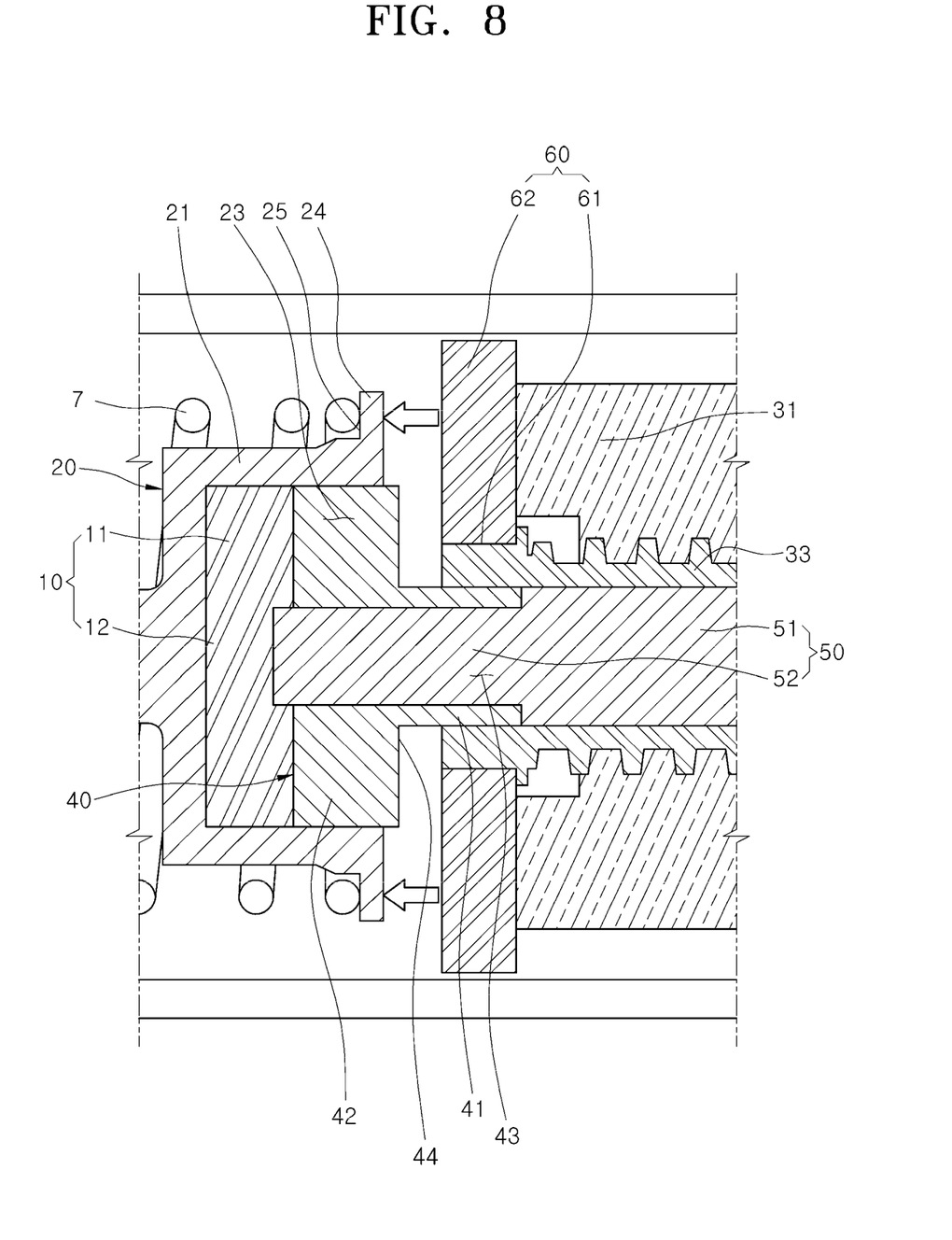
FIG. 8 is a cross-sectional diagram of the main portions illustrating a state where the pedal rod further moves toward the reaction disc in the state illustrated in FIG. 7.

FIG. 6 is a cross-sectional diagram of the main portions illustrating a pedal rod sole operation state of the electric booster for a vehicle according to the exemplary embodiment of the present disclosure, FIG. 7 is cross-sectional diagram of the main portions illustrating a state where the pedal rod further moves toward the reaction disc in the state illustrated in FIG. 6 and is in contact with the boosting block, and FIG. 8 is a cross-sectional diagram of the main portions illustrating a state where the pedal rod further moves toward the reaction disc in the state illustrated in FIG. 7.

When failure of the motor 2 occurs, the pedal rod sole operation state is implemented in which braking is performed only with the pedal stroke effort operated by the driver's depressing the brake pedal 6 without operation of the boosting by the driving force of the motor 2. At this time, as illustrated in FIGS. 6 and 7, the screw bolt 33 maintains a state of being stopped at the initial location, and only the pedal rod 50 moves forward toward the reaction disc 10.

As illustrated in FIG. 6, in the state where the pedal rod 50 moves forward by the second set width d2, the disc central pressing part 52 of the pedal rod 50 is in contact with the radially central portion 12 of the reaction disc 10. When the pedal rod 50 further moves forward by the fourth set width d3-d2 as illustrated in FIG. 7 in the state where the jump-in gap part 80 is canceled as illustrated in FIG. 6, the disc central pressing part 52 of the pedal rod 50 presses the radially central portion 12 of the reaction disc 10 by the fourth set width d3-d2.

In the state where the pedal rod 50 moves forward by the third set width d3 as described above, the second breakage prevention gap part 90 is canceled, and the boosting block pressing part 51 of the pedal rod 50 is in contact with the bolt inner diameter coupling part 41 of the boosting block 40. That is, the pedal rod 50 is in contact with the boosting block 40 which being in contact with the reaction disc 10, in the state of pressing the radially central portion 12 of the reaction disc 10 by the fourth set width d3-d2.

Thereafter, when the pedal rod 50 continuously moves forward, as illustrated in FIG. 8, the pedal rod 50 and the boosting block 40 are moved leftward with the same displacement as the pedal rod 50 in the state of being in contact with the radially central portion 12 and the radially outer portion 11 of the reaction disc 10, respectively, and press the reaction disc 10 toward the piston 4. In the above operation process, the radially central portion 12 of the reaction disc 10 is limitedly deformed only by the amount of elastic deformation corresponding to the fourth set width d3-d2, compared to the radially outer portion 11.

Accordingly, it is possible to prevent damage to the reaction disc 10 which is caused as only the radially inner portion 11 of the reaction disc 10 is intensively, elastically deformed, and more specifically, the radially central portion 12 of the reaction disc 10 is elastically deformed to the extent of exceeding the fourth set width d3-d2 compared to the radially outer portion 11 of the reaction disc 10.

In addition, an operation in which the pedal rod 50 further moves forward by the fourth set width d3-d2 and presses the radially central portion 12 of the reaction disc 10 after reaching the radially central portion 12 of the reaction disc 10, and an operation in which the boosting block 40 presses the radially outer portion 11 of the reaction disc 10 may be sequentially, consecutively performed, thereby preventing a hard pedal feel.

The present disclosure relates to the electric booster A for a vehicle, and is based on the assumption that the operation of the electric booster which generates a hydraulic pressure for stopping the vehicle by adding the driver's force to the boosting force by the motor 2 is implemented. In describing the present disclosure, detailed descriptions of structures, shapes, and operations of the components, which are not directly related to the subject matter of the present disclosure, such as the housing 1, the motor 2, the power transfer device 3, the piston 4, the cylinder 5, and the other components of the electric booster A for a vehicle which are well-known arts in the technical field of the present disclosure, will be omitted. As described above, it should be understood that the components of the electric booster A for a vehicle, which are not disclosed in the description of the present disclosure, are not limited to specific structures and shapes, and may be applied together with the present disclosure as various exemplary embodiments, including publicly-known arts in the technical field of the present disclosure.

The electric booster A for a vehicle according to the present disclosure having the aforementioned configuration may limit the amount of elastic deformation in the reaction disc 10 by the boosting block 40 to a value equal to or less than the set width, at which breakage does not occur, by the first breakage prevention gap part 70 formed between the disc holder 20 and the disc holder pressing hole 60 at the first set width d1, and the second breakage prevention gap part 90 formed between the boosting block 40 and the pedal rod 50 at the third set width d3.

Accordingly, it is possible to prevent the excessive stress, which is caused by only one side of the radially inner portion 11 and the radially central portion 12 of the reaction disc 10 is intensively, elastically deformed in the motor sole operation state or the pedal rod sole operation state, from being applied to the boundary portion between the radially outer portion 11 and the radially central portion 12. As a result, it is possible to prevent the damage to and breakage of the reaction disc 10.

The present disclosure may be easily implemented by the simple structure including only the component for implementing the boosting operation without additionally designing, manufacturing, and assembling the components, such as a buffer member and a key member, compared to the conventional exemplary embodiment in which the buffer member is additionally disposed between the pedal rod and the boosting block, or the pedal rod and the block member are integrally coupled to each other using the key member and the like, thereby improving productivity and reducing the cost. In addition, the present disclosure may be miniaturized, which is advantageous for the layout of a vehicle for utilizing a limited vehicle space.

Although the present disclosure has been described with reference to the exemplary embodiment illustrated in the drawings, this is only exemplary, and those skilled in the art to which the present disclosure pertains will understand that various modifications and other equivalent exemplary embodiments therefrom are possible. Accordingly, the true technical protection scope of the present disclosure will be defined by the appended claims.

What is claimed is:

1. An electric booster for a vehicle comprising:
   a reaction disc;
   a disc holder accommodating the reaction disc;
   a screw nut rotatable in conjunction with an operation of a motor;
   a screw bolt configured to be linearly moved toward the reaction disc in conjunction with a rotation of the screw nut;
   a boosting block disposed between the reaction disc and the screw bolt, and in contact with a radially outer portion of the reaction disc in response to movement of the screw bolt;
   a pedal rod extending through the screw bolt and the boosting block and contacting a radially central portion of the reaction disc;
   a disc holder pressing part connected to the screw bolt, and facing the disc holder; and
   a first breakage prevention gap part formed between the disc holder and the disc holder pressing hole at a first set width, and configured to limit an amount of elastic deformation in the reaction disc by the boosting block to the first set width or less,
   wherein the boosting block comprises:
      a bolt inner diameter coupling part fitted into an inner diameter portion of the screw bolt; and
      a disc outer pressing part connected to the bolt inner diameter coupling part, disposed to face the radially outer portion of the reaction disc outside the screw bolt, and configured to press the radially outer portion of the reaction disc at the first set width when the disc holder pressing hole is in contact with the disc holder.

2. The electric booster for the vehicle of claim 1, wherein the disc holder comprises:
   a disc accommodating part having a more expanded diameter than that of the reaction disc, the disc accommodating part being formed to extend in a moving direction of the screw bolt and accommodate the reaction disc;
   a piston pressing part consecutively formed at one side of the disc accommodating part, and in contact with a piston; and
   a connection opening part formed to be opened to the other side of the disc accommodating part, and forming a passage through which the boosting block and the pedal rod are inserted into the disc accommodating part.

3. The electric booster for the vehicle of claim 2, wherein the disc holder further comprises a pressing stabilizing part formed to protrude radially from an end of the disc accommodating part, and facing the disc holder pressing part together with the end of the disc accommodating part.

4. The electric booster for the vehicle of claim 3, wherein the disc holder further comprises an elastic member assembling part formed to be stepped at a bounder portion between the disc accommodating part and the pressing stabilizing part, and into which an elastic member for returning the reaction disc to an initial location is fitted and locked.

5. The electric booster for the vehicle of claim 1, wherein the boosting block further comprises a boosting transfer locking part formed to be stepped at a boundary portion between the bolt inner diameter coupling part and the disc outer pressing part, and locked to an end of the screw bolt.

6. The electric booster for the vehicle of claim 1, wherein the disc holder pressing part comprises:
   a bolt outer diameter coupling part coupled to an outer diameter portion of the screw bolt; and
   a holder pressing part formed to extend radially from the bolt outer diameter coupling part, the holder pressing part having a more expanded diameter than that of the reaction disc, disposed to face the disc holder, and being in contact with the disc holder when the amount of elastic deformation in the radially outer portion of the reaction disc reaches the first set width.

7. An electric booster for a vehicle comprising:
   a reaction disc;
   a disc holder accommodating the reaction disc;
   a screw nut rotatable in conjunction with an operation of a motor;

a screw bolt configured to be linearly moved toward the reaction disc in conjunction with a rotation of the screw nut;

a boosting block disposed between the reaction disc and the screw bolt, and in contact with a radially outer portion of the reaction disc in response to movement of the screw bolt;

a pedal rod extending through the screw bolt and the boosting block and contacting a radially central portion of the reaction disc;

a disc holder pressing part connected to the screw bolt, and facing the disc holder;

a first breakage prevention gap part formed between the disc holder and the disc holder pressing hole at a first set width, and configured to limit an amount of elastic deformation in the reaction disc by the boosting block to the first set width or less;

a jump-in gap part formed between the reaction disc and the pedal rod at a second set width; and a second breakage prevention gap part formed between the boosting block and the pedal rod at a third set width, and configured to limit the amount of elastic deformation in the reaction disc by the pedal rod to a value equal to or less than a fourth set width corresponding to a difference between the second set width and the third set width.

8. The electric booster for the vehicle of claim 7, wherein the boosting block comprises:

a bolt inner diameter coupling part coupled to be slidable to an inner diameter portion of the screw bolt, and facing the pedal rod;

a disc outer pressing part connected to the bolt inner diameter coupling part, and disposed to face the radially outer portion of the reaction disc outside the screw bolt; and a rod guide hole part formed through the bolt inner diameter coupling part and the disc outer pressing part, and configured to guide a movement of the pedal rod.

9. The electric booster for the vehicle of claim 8, wherein the pedal rod comprises:

a boosting block pressing part having a more expanded diameter than that of the rod guide hole part, the boosting block pressing part being disposed inside the screw bolt and disposed to face the bolt inner diameter coupling part at a separation interval corresponding to the third set width; and a disc central pressing part connected to the boosting block pressing part, extending toward the reaction disc through the rod guide hole part, and spaced apart from the reaction disc at a separation interval corresponding to the second set width.

10. An electric booster for a vehicle comprising:
a reaction disc;
a disc holder accommodating the reaction disc;
a screw nut rotatable in conjunction with an operation of a motor;
a screw bolt configured to be linearly moved toward the reaction disc in conjunction with a rotation of the screw nut;
a boosting block disposed between the reaction disc and the screw bolt, and configured to be in contact with a radially outer portion of the reaction disc when the screw bolt moves;
a pedal rod extending through the screw bolt and the boosting block and contacting a radially central portion of the reaction disc;
a disc holder pressing part connected to the screw bolt and facing the disc holder;
a jump-in gap part formed between the reaction disc and the pedal rod at a second set width; and
a second breakage prevention gap part formed between the boosting block and the pedal rod at a third set width, and configured to limit the amount of elastic deformation in the reaction disc by the pedal rod to a value equal to or less than a fourth set width corresponding to a difference between the second set width and the third set width.

11. The electric booster for the vehicle of claim 10, wherein the boosting block comprises:

a bolt inner diameter coupling part coupled to be slidable to an inner diameter portion of the screw bolt, and facing the pedal rod;

a disc outer pressing part connected to the bolt inner diameter coupling part, and facing the radially outer portion of the reaction disc outside the screw bolt; and a rod guide hole part formed through the bolt inner diameter coupling part and the disc outer pressing part, and configured to guide the movement of the pedal rod.

12. The electric booster for the vehicle of claim 11, wherein the pedal rod comprises:

a boosting block pressing part having a more expanded diameter than that of the rod guide hole part, the boosting block pressing part being disposed inside the screw bolt and to face the bolt inner diameter coupling part at a separation interval corresponding to the third set width; and a disc central pressing part connected to the boosting block pressing part, extending toward the reaction disc through the rod guide hole part, and spaced apart from the reaction disc at a separation interval corresponding to the second set width.

* * * * *